US007065059B1

(12) United States Patent
Zinin

(10) Patent No.: US 7,065,059 B1
(45) Date of Patent: Jun. 20, 2006

(54) TECHNIQUE FOR RESTORING ADJACENCIES IN OSPF IN A NON-STOP FORWARDING INTERMEDIATE NODE OF A COMPUTER NETWORK

(75) Inventor: Alexey Dimitrievich Zinin, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 925 days.

(21) Appl. No.: 09/925,827

(22) Filed: Aug. 9, 2001

(51) Int. Cl.
*H04H 1/00* (2006.01)
*H04L 12/48* (2006.01)
*H04J 3/36* (2006.01)
*H04Q 7/20* (2006.01)
*G06F 15/177* (2006.01)

(52) U.S. Cl. ............... 370/312; 370/338; 370/346; 370/349; 370/397; 370/400; 370/432; 455/432.1; 455/455; 709/220; 709/242

(58) Field of Classification Search ........ 370/216–218, 370/389–397, 254, 231, 401, 225–228, 221, 370/242, 238, 241, 452, 400, 466, 256, 380, 370/451, 316; 709/242, 235, 239, 238, 223, 709/224, 218, 227, 230, 203, 200, 245; 714/4
See application file for complete search history.

(56) References Cited

U.S. PATENT DOCUMENTS

| 5,473,599 | A | * | 12/1995 | Li et al. ............... 370/219 |
| 5,519,704 | A | | 5/1996 | Farinacci et al. |
| 5,926,463 | A | * | 7/1999 | Ahearn et al. ............ 370/254 |
| 6,157,649 | A | * | 12/2000 | Peirce et al. ............ 370/401 |
| 6,195,705 | B1 | | 2/2001 | Leung |
| 6,418,139 | B1 | * | 7/2002 | Akhtar ............... 370/356 |
| 6,449,279 | B1 | * | 9/2002 | Belser et al. ............ 370/397 |
| 6,487,605 | B1 | * | 11/2002 | Leung ............... 709/245 |
| 6,507,562 | B1 | * | 1/2003 | Kadansky et al. ........ 370/216 |
| 6,580,715 | B1 | * | 6/2003 | Bare ............... 370/396 |
| 6,614,757 | B1 | * | 9/2003 | Rochberger et al. ...... 370/231 |
| 6,631,420 | B1 | * | 10/2003 | Li et al. ............... 709/242 |
| 6,701,361 | B1 | * | 3/2004 | Meier ............... 709/224 |
| 6,711,171 | B1 | * | 3/2004 | Dobbins et al. .......... 370/400 |
| 6,728,214 | B1 | * | 4/2004 | Hao et al. ............ 370/241 |
| 6,820,120 | B1 | * | 11/2004 | Keats et al. ............ 709/223 |

(Continued)

OTHER PUBLICATIONS

Zinin, Alexey Dimitrievich, Technique for Resynchronizing LSDB in OSPF after a Software Reload in a Non-Stop Forwarding Intermediate Node of a Computer Network, U.S. Appl. No. 09/925,800.

(Continued)

*Primary Examiner*—Alpus H. Hsu
*Assistant Examiner*—Prenell Jones
(74) *Attorney, Agent, or Firm*—Cesari and McKenna LLP

(57) ABSTRACT

A technique restores adjacencies between a non-stop forwarding (NSF) router and its neighboring routers during reload of routing protocol software on the NSF router within a computer network. When a new instance of the routing protocol software is re-loaded, each interface of the NSF router is placed in a special state that enables it to receive incoming Hello packets from its neighboring routers. When placed in the special state, the interface passively "listens" for incoming Hello packets from the neighbors to determine which neighbors send the packets. The router thereafter promptly creates and sends a unicast Hello packet to each neighbor from whom it has received an incoming Hello packet and creates associated neighbor data structures.

65 Claims, 6 Drawing Sheets

U.S. PATENT DOCUMENTS

| | | | |
|---|---|---|---|
| 6,850,486 B1* | 2/2005 | Saleh et al. | 370/218 |
| 6,865,160 B1* | 3/2005 | Bare | 370/256 |
| 6,885,677 B1* | 4/2005 | Klevans | 370/466 |
| 6,950,427 B1* | 9/2005 | Zinin | 370/386 |
| 6,985,959 B1* | 1/2006 | Lee | 709/238 |
| 2002/0150094 A1* | 10/2002 | Cheng et al. | 370/389 |
| 2003/0016624 A1* | 1/2003 | Bare | 370/217 |
| 2003/0056138 A1* | 3/2003 | Ren | 714/4 |
| 2005/0135234 A1* | 6/2005 | Saleh et al. | 370/218 |

OTHER PUBLICATIONS

Moy, J., OSPF Version 2, Request For Comments 2328, Network Working Group, Internet Engineering Task Force, 1998, pp. 1-244.

\* cited by examiner

TECHNIQUE FOR RESTORING ADJACENCIES IN OSPF IN A NON-STOP FORWARDING INTERMEDIATE NODE OF A COMPUTER NETWORK

CROSS-REFERENCE TO RELATED APPLICATIONS

The present invention is related to the following co-pending and commonly assigned U.S. Patent Application:

U.S. patent application Ser. No. 09/925,800 titled, Technique for Resynchronizing LSDB in OSPF after a Software Reload in a Non-Stop Forwarding Intermediate Node of a Computer Network, which application was filed on even date herewith and is hereby incorporated by reference as though fully set forth herein.

FIELD OF THE INVENTION

This invention relates generally to computer networks, and more particularly, to routing protocols within a non-stop forwarding intermediate node of a computer network.

BACKGROUND OF THE INVENTION

A computer network is a geographically distributed collection of interconnected communication links for transporting data between nodes, such as computers. Many types of computer networks are available, with the types ranging from local area net-works (LANs) to wide area networks (WANs). The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnect computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. An example of such a protocol is the Open Shortest Path First (OSPF) routing protocol. The OSPF protocol is based on link-state technology and, therefore, is hereinafter referred to as a link state routing protocol.

Each router running the link state routing protocol maintains an identical link state database (LSDB) describing the topology of the autonomous system (AS). Each individual piece of the LSDB is a particular router's local state, e.g., the router's usable interfaces and reachable neighbors or adjacencies. As used herein, neighboring routers (or "neighbors") are two routers that have interfaces to a common network, wherein an interface is a connection between a router and one of its attached networks. Moreover, an adjacency is a relationship formed between selected neighboring routers for the purpose of exchanging routing information and abstracting the network topology. One or more router adjacencies may be established over an interface. Each router distributes its local state throughout the domain in accordance with an initial LSDB synchronization process and a conventional flooding algorithm.

In order to guarantee convergence of a link state routing protocol, it should be ensured that link state protocol data units (PDUs) that originate after an initial LSDB synchronization between neighbors is completed are delivered to all routers within the flooding scope limits. These limits may comprise an area or the entire AS, depending on the protocol and the type of link-state PDU. An area is a collection or group of contiguous networks and nodes (hosts), together with routers having interfaces to any of the included networks. Each area runs a separate copy of the link state routing algorithm and, thus, has its own LSDB. In the case of OSPF, the PDU is a link state advertisement (LSA) comprising a unit of data describing the local state of a router or network. The collected PDUs of all routers and networks form the LSDB for the particular link state routing protocol.

The infrastructure of a typical router comprises functional components organized as a control plane and a data plane. The control plane includes the functional components needed to manage the traffic forwarding features of the router. These features include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented within the single processor. However, for some high performance routers, these planes are implemented within separate devices of the intermediate node. For example, the control plane may be implemented in a supervisor processor, such as a route processor, whereas the data plane may be implemented within a hardware-assist device, such as a co-processor or a forwarding processor. In other words, the data plane is typically implemented in a specialized piece of hardware that is separate from the hardware that implements the control plane.

The control plane generally tends to be more complex than the data plane in terms of the quality and quantity of software operating on the supervisor processor. Therefore, failures are more likely to occur in the supervisor processor when executing such complicated code. In order to ensure high availability in an intermediate network node, it is desirable to configure the node such that if a failure arises with the control plane that requires restarting and reloading of software executing on the supervisor processor, the data plane continues to operate correctly. Restarting and reloading of control plane software may be necessary because of a failure with the routing protocol process, e.g., an OSPF module, or a software upgrade to the OSPF module. A router that is configured to enable its data plane to continue packet forwarding operations during restart and reload of the control plane software is referred to as a non-stop forwarding (NSF) capable router.

As noted, the OSPF routing protocol creates adjacencies between neighboring routers for the purpose of exchanging routing information. These adjacencies are established and maintained through the use of a conventional Hello protocol. The Hello protocol is described in *Request for Comments* (*RFC*) 2328, *OSPF Version* 2, by J. Moy (1998). Broadly stated, the Hello protocol ensures that communication between neighbors is bi-directional by periodically sending Hello packets out all router interfaces. Bi-directional communication is indicated when the router "sees" itself listed in the neighbor's Hello packet. On broadcast and non-broadcast multi-access (NBMA) net-works, the Hello protocol elects a designated router (DR) for the network.

For conventional link-state routing protocols, the periodically sent Hello packets are used to ensure reachability of the neighboring routers. If no Hello packet has been received from a router within a predefined period of time, e.g., a RouterDeadInterval in OSPF (40 seconds by default), its neighbors declare the router to be unreachable and stop forwarding traffic to it. The RouterDeadInterval ("inactivity timer") is used for maintaining adjacencies with neighboring routers, whereas a Hello interval is the period of time between which Hello packets are sent. In addition, the neighbors inform other routers about the unreachable router and, thus, the change to the network topology. Therefore, a control plane restart is "visible" to neighboring routers as a topology change in the network that requires those neighbors having "knowledge" of the network to recompute their routing databases and route around the unreachable router.

Assume the OSPF routing protocol module is reloaded in a NSF-capable router. During the reload process, the router stops sending Hello packets out of its interfaces, which results in "dropping" of the existing adjacencies with its neighboring routers. As a result, the NSF router does not receive any data traffic from the routers on the network even though it may be able to forward traffic to the network. Consequently, for a NSF-capable router to still forward transit (packet) traffic, it must send its first Hello packet (i.e., the Hello interval) after the routing software reload within the inactivity timer interval. This is typically not an issue since most modern routers can reload or activate a secondary control board (or new OSPF module) within the inactivity timer interval. If the reload process takes more than 40 seconds, the Hello and inactivity timer intervals may be configured with a greater value.

A problem with the Hello protocol is that when a router reloads, it does not know its neighbors until it receives at least one Hello packet from each of them. All Hello packets include a list of neighbors that the sending router has "heard from". If the router sends a Hello packet not listing its neighbors, the neighbors drop the adjacencies because a 2-way connectivity condition has not been met. In other words, the reloading router cannot send Hello packets over its interfaces until those preexisting neighbor adjacencies are known to it. Otherwise, the Hello packets are sent without the router ID of the neighboring router, causing the neighbor to reset its adjacency with the router and eventually stop forwarding traffic to it. A goal of a NSF-capable router is to continue forwarding traffic during restart/reload of control plane software, such as the OSPF routing protocol software, so that the reload is transparent to the router's neighbors. Accordingly, the present invention provides a backward-compatible technique that allows the router to identify its neighbors after reload of routing protocol software to thereby maintain (i.e., "keep up") its adjacencies with its neighboring routers.

SUMMARY OF THE INVENTION

The present invention comprises a technique for restoring adjacencies between a non-stop forwarding (NSF) router and its neighboring routers during reload of routing protocol software on the NSF router within a computer network. When a new instance of the routing protocol software is reloaded, each interface of the NSF router is placed in a special state that enables it to receive incoming Hello packets from its neighboring routers. In the illustrative embodiment, the routing protocol is preferably the Open Shortest Path First (OSPF) routing protocol and the special interface state is preferably a Waiting state with a Preempt flag asserted (i.e., the Waiting/Preempt state). According to an aspect of the invention, the Preempt flag is provided as an addition to a conventional neighbor data structure defined by the OSPF protocol.

When placed in the Waiting/Preempt state, the interface passively "listens" for (receives) incoming Hello packets from the neighbors to determine which neighbors send the packets. The interface also determines whether a neighbor data structure exists for each neighbor sending an incoming Hello packet. If not, a neighbor data structure is created for that neighbor and the Preempt flag is asserted. According to another aspect of the present invention, the router thereafter promptly creates and sends a unicast Hello packet directed to each neighbor from whom it has received an incoming Hello packet. Notably, the unicast Hello packet is sent as a unicast transmission as opposed to a multicast transmission over the interface.

After reloading the routing protocol software, the NSF router typically does not know its neighbors until it hears at least one Hello packet from each of them. All Hello packets include a list of neighbors from whom the sending router has received incoming Hello packets. If the NSF router sends a Hello packet not listing its neighbors, the neighbors will drop the adjacencies because a 2-way connectivity condition is not met. By sending a unicast Hello message to each neighbor, the NSF router prevents a situation where the existing adjacencies with its neighboring routers are destroyed as a result of those neighbors not recognizing their router IDs within the Hello packet.

When an interface is placed in the Waiting/Preempt state waiting for incoming Hello packets, it is possible that a neighbor's RouterDeadInterval (i.e., the inactivity timer) may expire ("fire") before its Hello interval. In response to firing of the inactivity timer, the neighbor resets the adjacencies with the NSF router before sending it the Hello packet (and before the NSF router can return the unicast Hello packet). To prevent this situation from arising, as soon as the interface is placed in the Waiting/Preempt state, the NSF router frequently sends ("multicasts") empty link state Update packets over the interface. Notably, an empty link state Update packet does not contain any LSAs. For an OSPF protocol environment, when a neighbor receives a valid packet, such as a link state Update packet, it may reset the inactivity timer for the sending router. Typically, an empty link state Update packet is not sent by a router; however, in accordance with another aspect of the invention, the empty link state Update packet is sent to force the neighbor to reset the inactivity timer for the NSF router.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
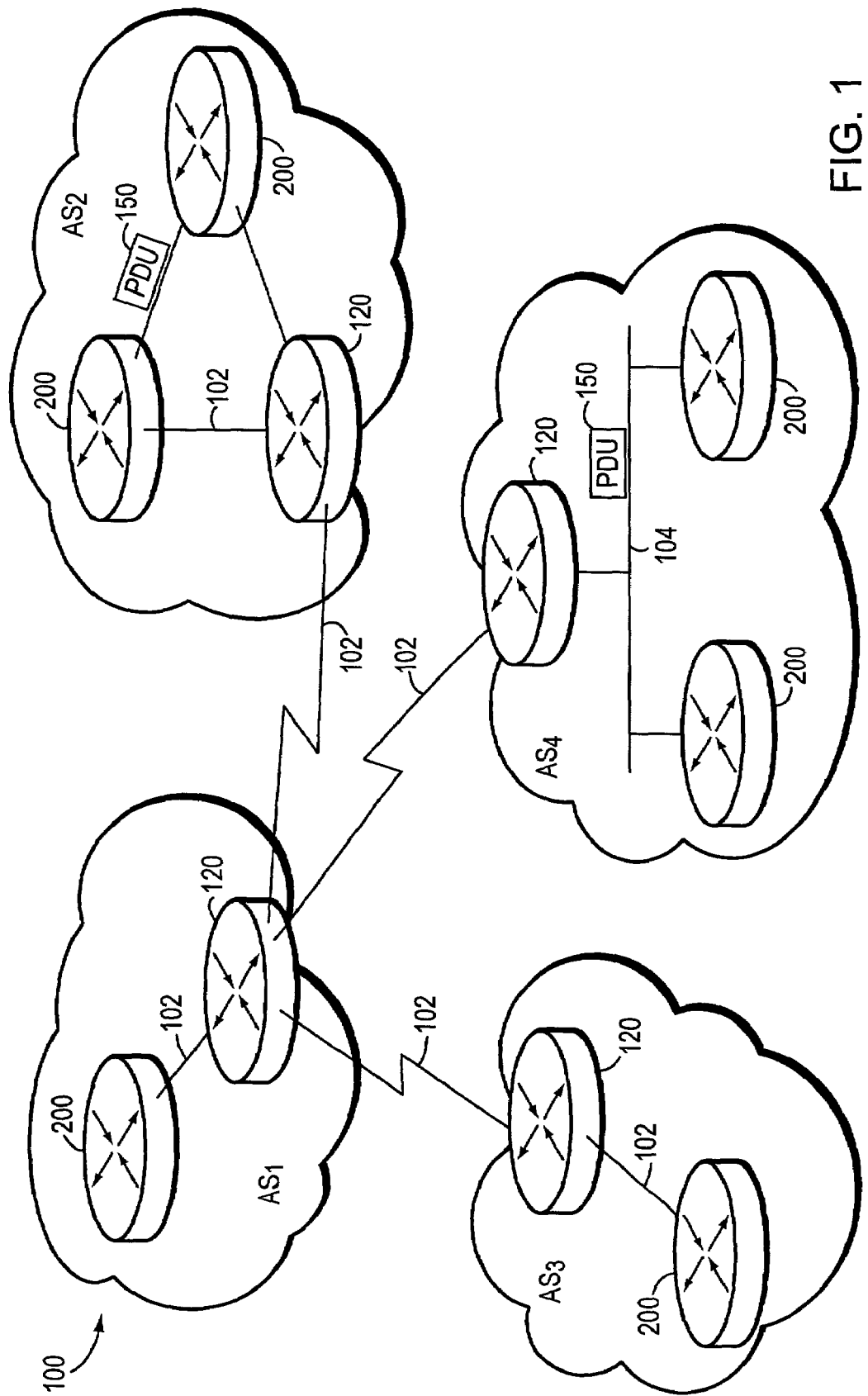
FIG. 1 is a schematic block diagram of a computer network comprising a plurality of autonomous systems or routing domains including intermediate nodes, such as intra-domain routers.

FIG. 1 is a schematic block diagram of a computer network 100 comprising a plurality of routing domains or autonomous systems interconnected by intermediate nodes, such as conventional interdomain routers 120 and intradomain routers 200. The interdomain routers 120 interconnect various autonomous systems ($AS_{1-4}$), whereas the intradomain routers 200 manage communication media and nodes within their respective AS domains. The communication media include shared medium networks 104, such as local area networks (LANs), point-to-point links 102 and non-broadcast multi-access (NBMA) clouds such as frame relay or asynchronous transfer node networks. Communication among the routers is typically effected by exchanging discrete data units or packets in accordance with predefined protocols, such as the Transmission Control Protocol/Internet Protocol (TCP/IP). It will be understood to those skilled in the art that other protocols, such as the Internet packet exchange (IPX) protocol and associated link state routing protocols (e.g., NLSP), may be advantageously used with the present invention.

Figure 2:
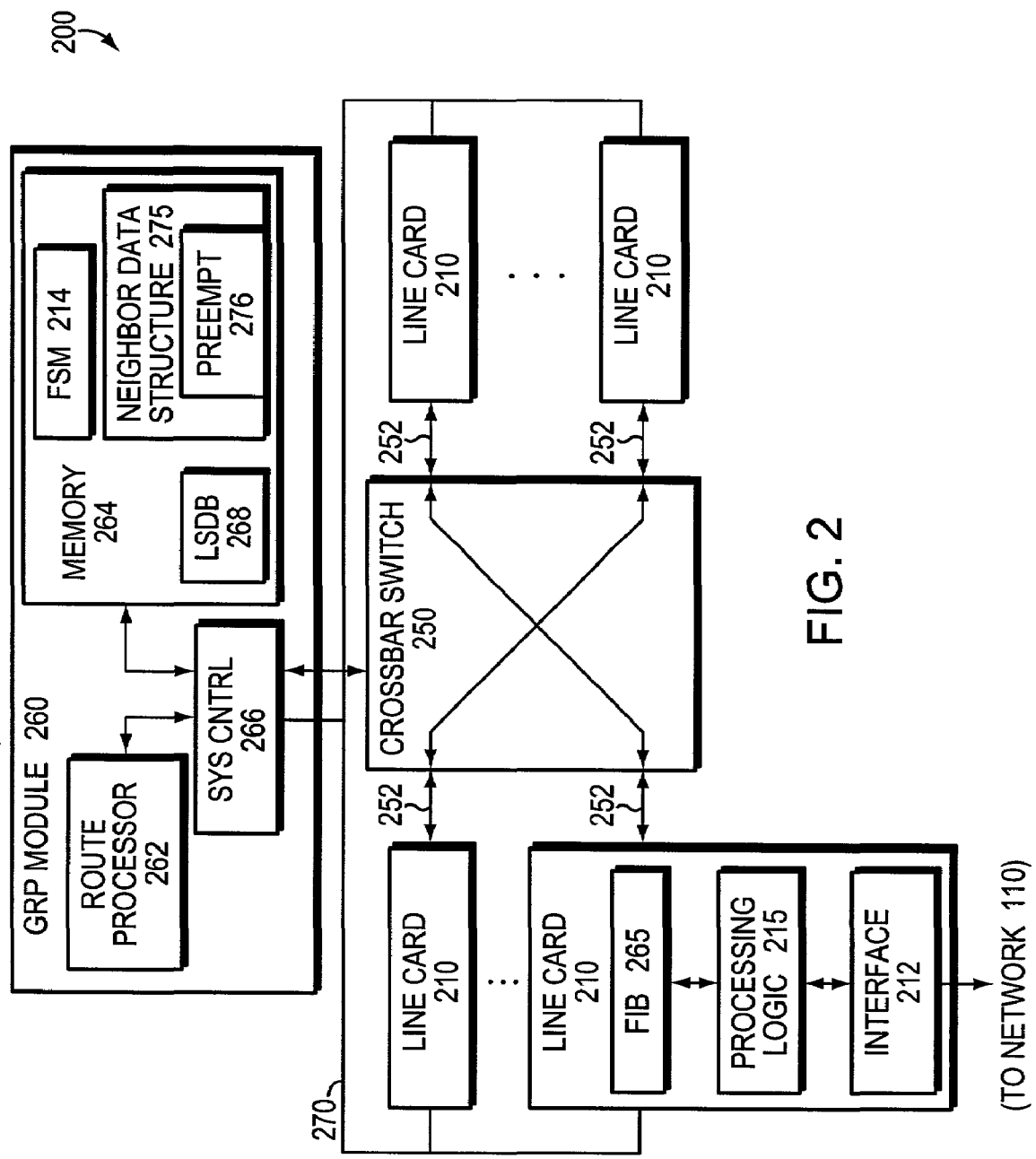
FIG. 2 is a schematic block diagram of a router that may be advantageously used with the present invention.

FIG. 2 is a schematic block diagram of an intradomain router 200. An example of the router 200 that may be illustratively used with the present invention is the GSR 12000 series gigabit switch router (GSR) available from Cisco Systems, Inc. The router 200 is preferably based on a high-speed distributed architecture optimized for routing and packet forwarding functions. To that end, the router comprises a gigabit route processor (GRP) module 260 and a plurality of line cards 210 interconnected by a crossbar switch 250. The crossbar switch 250 is a multi-gigabit crossbar switching fabric configured to provide high-capacity switching operations at gigabit rates among the line cards over point-to-point serial data lines 252. Each line card 210 includes at least one interface 212 comprising circuitry needed to connect the router to a communication medium of the network. Each line card 210 further includes conventional processing logic 215 needed to perform the packet-forwarding functions for the router.

The GRP module 260 is a processor-based, routing system suite comprising functionality incorporated within a typical router. That is, the GRP module comprises a route processor 262 coupled to a memory 264 via a system controller 266. The memory 264 may comprise synchronous dynamic random access memory (SDRAM) storage locations addressable by the processor 262 for storing software programs and data structures. A network routing operating system, portions of which are typically resident in memory and executed by the route processor, functionally organizes the router by, inter alia, invoking network operations in support of software processes executing on the router. It will be apparent to those skilled in the art that other memory means, including various computer readable media, may be used for storing and executing program instructions pertaining to the operation of the router.

The route processor 262 performs configuration management and control functions for the router 200 and communicates with neighboring peer routers to exchange protocol data units (PDUs) used to construct routing tables in accordance with conventional routing algorithms. The route processor also computes and loads forwarding information base (FIB) tables 265 used by the line cards 210. A copy of the FIB tables 265 computed by the route processor 262 is distributed to each line card 210 over a management control bus 270. Each "source" line card performs an independent lookup of a destination address for each incoming packet using a local copy of the FIB table and then forwards the packet over the crossbar switch 250 to a "destination" line card.

The functional infrastructure of the router 200 is preferably divided into a data plane and a control plane. The data plane includes components used to retrieve data packets from the network and provide those packets to forwarding logic of the router (and vice versa). In contrast, the control plane includes those entities used to manage/control traffic forwarding operations of the router. In the illustrative embodiment, the infrastructure of the router includes distributed processing logic 215 configured to perform packet forwarding operations and physical port interfaces 212 resident on the line cards 210 that do not have direct access to the route processor 262 over the data plane. This infrastructure allows the router to continue performing traffic forwarding operations throughout the data plane in the presence of a failure or software reload within the control plane. In essence, the infrastructure enables the intradomain router 200 to function as a non-stop forwarding (NSF) capable router.

Figure 3:
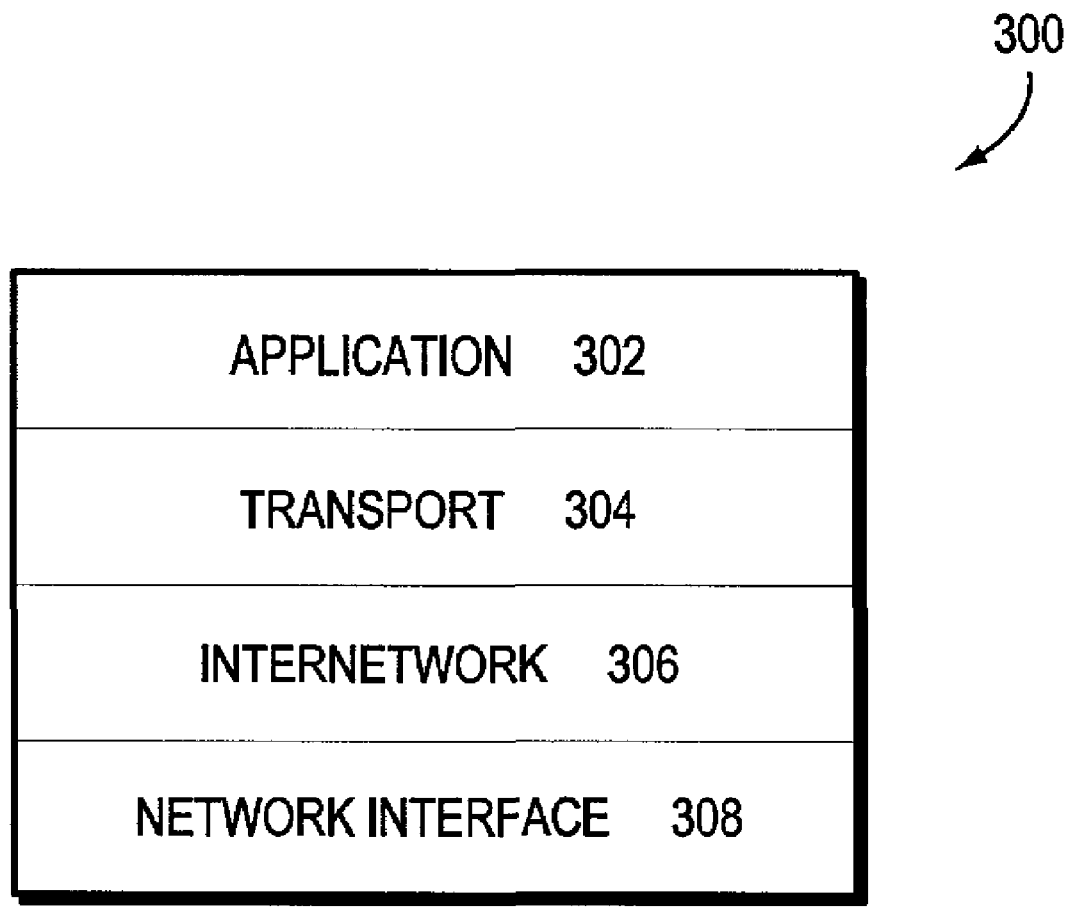
FIG. 3 is a schematic block diagram of a conventional protocol stack, such as the Internet communications protocol stack, within the router of FIG. 2.

A key function of the router is determining the next node to which a packet is sent; in order to accomplish such "routing" the routers cooperate to determine optimal paths (i.e., "best links") through the computer network 100. The routing function is preferably performed by an internetwork layer of a conventional protocol stacked within each router. FIG. 3 is a schematic block diagram of a conventional protocol stack, such as the Internet communications protocol stack 300. The architecture of the Internet protocol stack 300 is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the Internet protocol (IP). IP is primarily a connectionless protocol that provides internetwork routing, fragmentation and assembly of exchanged packets—generally referred to as "datagrams" in an Internet environment—and which relies on transport protocols for end-to-end reliability. An example of such a transport protocol is the Transmission Control Protocol (TCP) which is implemented by the transport layer 304 and provides connection-oriented services to the upper layer protocols of the Internet architecture. The term TCP/IP is commonly used to denote the Internet architecture.

In particular, the internetwork layer 306 concerns the protocol and algorithms that the routers 200 utilize so that they can cooperate to calculate paths through the computer network 100. An intradomain protocol may be used to perform intradomain routing (for the Internetwork layer) within each AS of the computer network 100. An example of a protocol used to distribute routing information between neighboring routers belonging to a single AS is the Open Shortest Path First (OSPF) link state routing protocol. The OSPF routing protocol is well known and described in detail in *Request for Comments (RFC)* 2328, *OSPF version* 2, by J. Moy (1998) and *Interconnections, Second Edition* by R. Perlman, published by Addison Wesley Publishing company (2000).

In a link state routing protocol, each intradomain router maintains a link state database (LSDB 268, shown in FIG. 2) and each participating intradomain router has an identical LSDB. Each individual piece of the LSDB is a particular router's local state (e.g., the router's usable interfaces and reachable neighbors) that is distributed by the router throughout the AS in accordance with a flooding algorithm. The reachable neighbors (e.g., other intradomain routers 200 within $AS_{2,4}$ of FIG. 1) are associated with the intradomain router through an adjacency relationship that enables the exchange of routing information between the routers. This adjacency relationship is established and maintained using a Hello protocol defined by the OSPF routing protocol.

Figure 4:
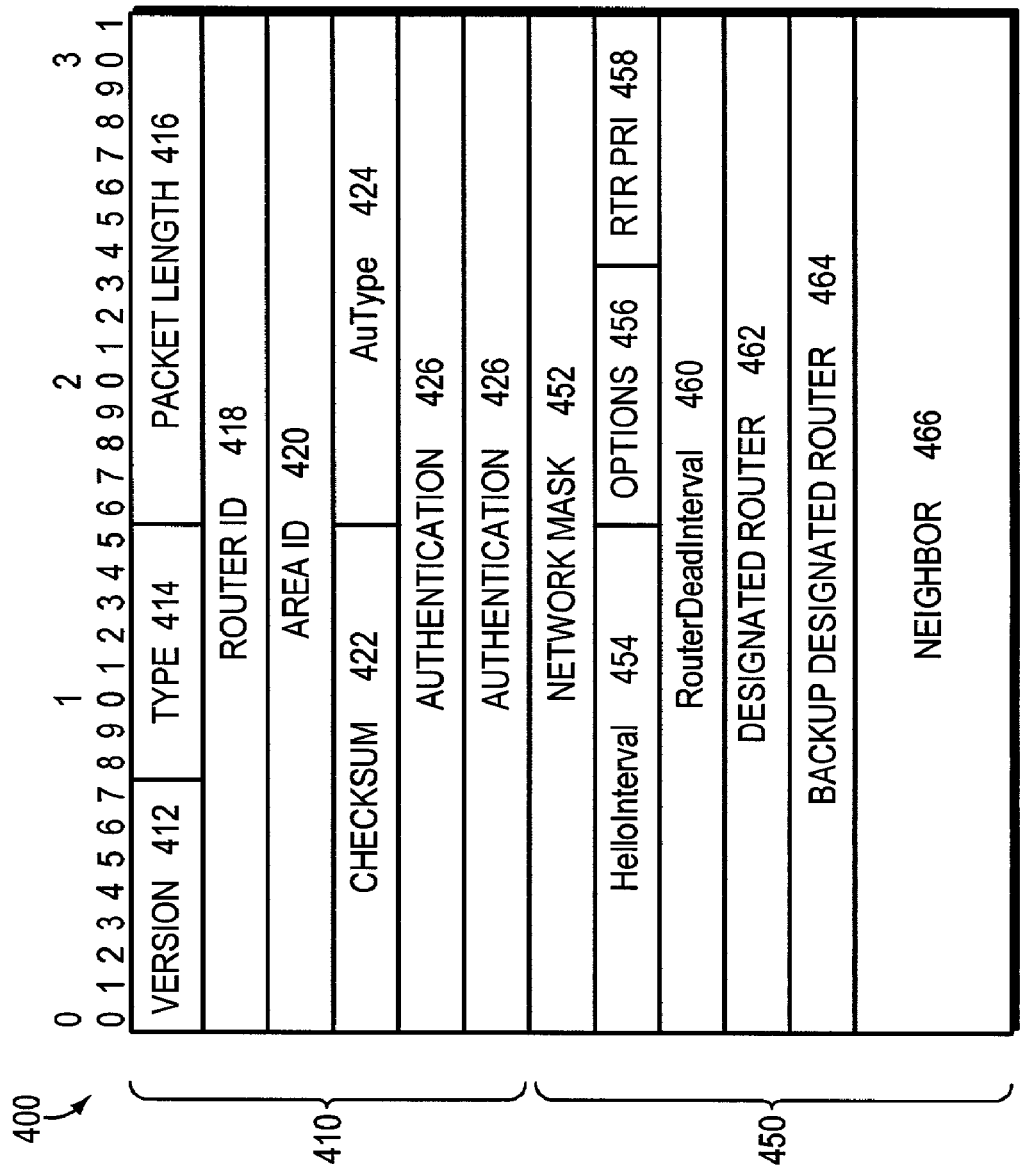
FIG. 4 is a schematic block diagram depicting the format of a Hello packet that may be advantageously used with the present invention.

FIG. 4 is a schematic block diagram depicting the format of a conventional Hello packet 400 comprising an OSPF packet header 410 and Hello-specific packet fields 450. All OSPF packets are encapsulated within IP packets and each OSPF packet, such as a Hello packet, starts with a standard 24-byte OSPF header 410. The header contains information needed to determine whether the packet should be accepted for further processing. The Hello packet is an OSPF type 1 packet that is periodically sent over interfaces of the router to establish and maintain neighbor adjacencies. All routers connected to a common network must agree on certain parameters, such as HelloInterval and RouterDeadInterval, included in the Hello packet. It should be noted that disagreement over these parameters will inhibit the forming of the neighbor adjacencies.

The OSPF packet header 410 includes a version field 412 containing the OSPF version number, a type field 414 containing the type of OSPF packet and a packet length field 416 including the length of the OSPF protocol packet in bytes. The header 410 also includes a router ID field 418 containing the router identifier (ID) of the source of the packet and an area ID field 420 whose contents identify the area to which the packet belongs. A checksum field 422 containing a standard IP checksum of the entire contents of the packet, starting with the OSPF packet header but excluding a 64-bit authentication field. An authentication type (AuType) field 424 identifies the authentication procedure to be used for the packet and authentication field 426 contains a 64-bit value for use by the authentication scheme.

The Hello-specific packet fields 450 include a network mask field 452 identifying the network mask associated with the particular router interface. A HelloInterval field 454 contains a value representing the number of seconds between Hello packets issued by the router, while an options field 456 identifies optional capabilities supported by the router. A router priority value is contained in a router priority (Rtr Pri) field 458 and a RouterDeadInterval field 460 includes a value (i.e., an "inactivity timer") indicating the number of seconds before declaring a silent router down. A designated router field 462 identifies the designated router (DR) for the network, whereas a backup designated router field 464 identifies the backup designated router (BDR) for the network. Lastly, a neighbor field 466 contains the router ID of each router from whom valid Hello packets have been recently received over the network.

When an NSF-capable router reloads its routing software (e.g., OSPF routing protocol software module) it does not actively send Hello packets 400 since it does not know its neighbors. If the router sends Hello packets that do not contain the router IDs of the neighbors in the neighbor field 466 of the packet, those neighbors destroy the existing adjacencies. To avoid such a situation, the present invention is directed to making an OSPF routing module reload sequence transparent to the NSF router's neighbors. To that end, the present invention is directed to maintaining those existing adjacencies between the NSF router and its neighbors during reload of a new instance of the OSPF software.

Specifically when the NSF router receives an incoming Hello packet from a neighbor, it creates a conventional neighbor data structure for it. The neighbor data structure (shown at 275 in FIG. 2) is defined by the OSPF routing protocol as describing each "conversation" between the NSF router and its neighboring router. Each conversation is bound to a particular router interface 212 and is identified either by the router ID of the neighboring router or by its neighbor IP address. Broadly stated, the neighbor data structure 275 contains all information pertinent to the forming or formed adjacency between the two neighboring routers. In this context, an adjacency is considered a highly developed conversation between two routers.

According to an aspect of the present invention, the NSF router also immediately sends a unicast Hello message 400 in reply to the neighbor, listing the neighbor in the neighbor field 466. Notably, the unicast Hello packet is sent as a unicast transmission as opposed to a multicast transmission over the interface. Moreover, the router scans through all of the router IDs listed in the neighbor field of the received incoming Hello packet and verifies that it has a neighbor data structure 275 for each of the neighbors. If there is no neighbor data structure for a particular neighbor, the router creates both the structure for the neighbor and a unicast Hello packet containing the router ID of the neighbor. The NSF router then sends the unicast Hello packet to the neighbor to ensure that the adjacency is maintained by the neighbor.

Specifically, a new flag is introduced to the OSPF neighbor data structure, called Preempt (shown at 276 in FIG. 2). When asserted, the Preempt flag 276 indicates that a conventional finite state machine (FSM 214 in FIG. 2) associated with each router interface 212 and the Hello protocol operate in a non-standard manner to allow the router to preempt (or "pick up") its former adjacencies. When NSF-capable router has rebooted, all of its interfaces 212 regardless of the interface type are placed into a Waiting state and the Preempt flag is asserted. The Waiting state is defined by the OSPF protocol as one of various states that a router interface may attain. In the conventional Waiting state, the router monitors incoming Hello packets to determine, e.g., the identity of the DR (BDR). However, in accordance with the present invention, when the interface FSM 214 is placed into the special Waiting/Preempt state, i.e., the Waiting state with Preempt flag asserted, a Hello timer (associated with the Hello interval) is not started for that interface. This means that the router does not actively send Hello packets. Instead, the NSF router processes incoming Hello packets and immediately replies to them as described above.

Figure 5:
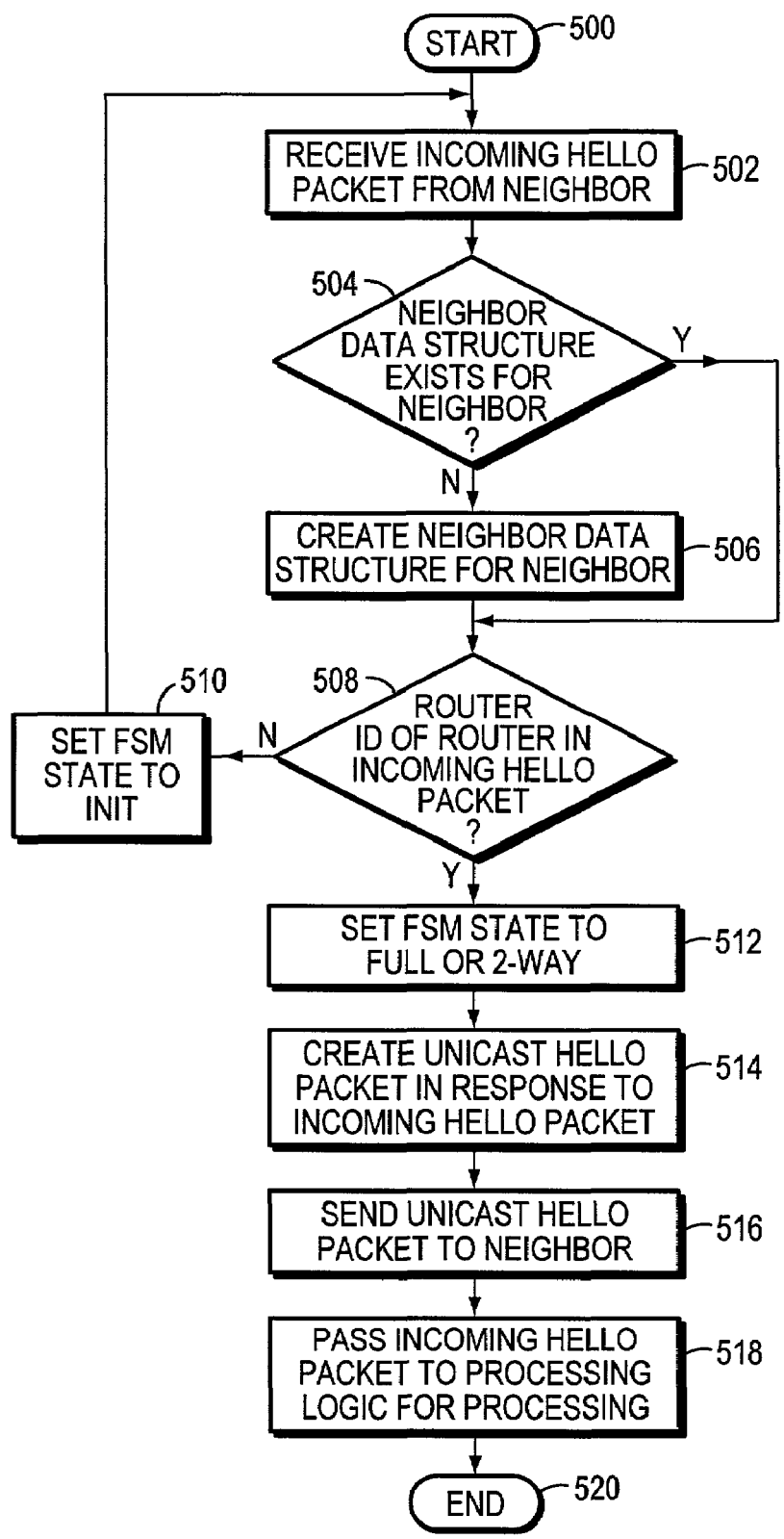
FIG. 5 is a flowchart illustrating the sequence of steps involved in processing of a Hello packet while an interface of the router is in a Waiting/Preempt state.

FIG. 5 is a flowchart illustrating the sequence of steps involved in processing of incoming Hello packets and while the router interface is in the novel Waiting/Preempt state. The sequence starts at Step 500 and proceeds to Step 502 where an incoming Hello packet is received at the router from a neighbor. In Step 504, a determination is made as to whether a neighbor data structure exists that corresponds to the neighbor that sent the incoming Hello packet. If not, the router creates a new instance of the neighbor data structure 275 for that neighbor in Step 506. The sequence then proceeds to Step 508 where it is determined whether the incoming Hello packet contains the router ID of the receiving NSF router. If so, in Step 512 the FSM state of the new neighbor is set to Full or 2-Way, depending on the link type and the DR/BDR status of the router and the neighbor according to the received incoming Hello packet. Otherwise, in Step 510, the FSM state is set to Init and the sequence returns to Step 502.

In Step 514, the router, in response to the received incoming Hello packet from the neighbor, immediately creates a unicast Hello packet. Here, the destination IP address of the IP packet carrying the unicast Hello packet is the IP address of the neighbor that sent the incoming Hello packet. The DR and BDR fields 462, 464 of the unicast Hello packet are assigned values received in the incoming Hello packet. The list of router IDs in the neighbor field 466 is set to the router ID of the neighboring router that sent the incoming Hello packet. This ensures that the remote neighboring router does not generate a 1-Way Received event for the corresponding neighbor FSM. In Step 516, the router sends the unicast Hello packet 400 over the interface 212 and network to the neighbor. In Step 518, the received incoming Hello packet is passed to the OSPF processing logic 215 for standard processing. The sequence then ends in Step 520.

Note that if the interface type is broadcast, the DR/BDR values and list of neighbors from the received incoming Hello packet are copied into the unicast Hello packet and the router ID of the sending neighbor is added to the list of neighbors. Optionally, the NSF router's router ID can be removed and the Hello packet can be sent as a multicast transmission over the interface 212. This option prevents a situation where a neighbor does not have enough time to send its Hello packet or where the Hello packet is lost. Assuming that other routers on the segment have already established adjacencies with each other, it is sufficient to send such a Hello packet only when the received incoming Hello packet contains at least one unknown router ID.

While there has been shown and described an illustrative embodiment for restoring adjacencies between a NSF router and its neighbors during reload of routing protocol software on the router, it is to be understood that various other adaptations and modifications may be made within the spirit and scope of the invention. For example while the NSF router is passively waiting for incoming Hello packets at its interfaces, a neighbor may be waiting for a Hello packet from the router and, not having received it, declares the NSF router down after the inactivity timer expires ("fires"). The inactivity timer for a router is typically reset when a neighbor receives a valid OSPF packet from the router (even though the OSPF specification requires this to be done on receipt of a Hello packet only). According to another aspect of the invention, the NSF router attempts to prevent expiration of the inactivity timer by frequently "multicasting" empty link state Update packets over its interfaces to its neighbors. Although not typically sent by a router, an empty link state Update packet is considered a valid OSPF packet. In accordance with an aspect of the invention, however, empty link state Update packets 600 are sent to force the neighbors of the NSF router to reset the inactivity timer for the router.

Figure 6:
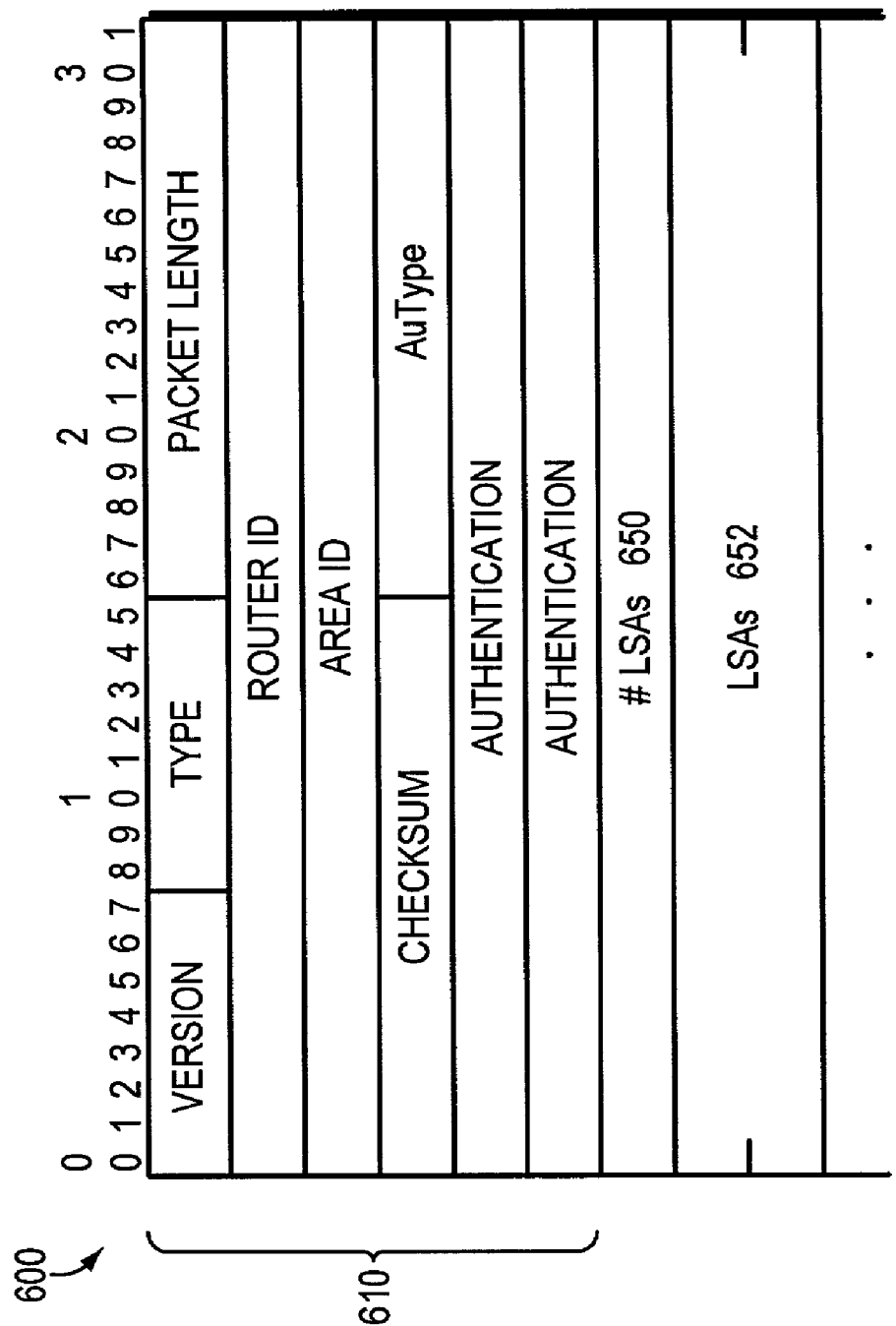
FIG. 6 is a schematic block diagram depicting a link state Update packet that may be advantageously used with the present invention.

FIG. 6 is a schematic block diagram depicting a link state Update packet 600 that may be advantageously used with the present invention. The link state Update packet 600 includes an OSPF header 610 similar to the OSPF 410 of the Hello packet 400. In addition, the link state Update packet includes a link state acknowledgement (LSA) number field 650 containing a value indicating the number of LSAs included in the Update packet 600. Appended to the link state Update packet are LSAs 652 accompanying the packet 600. Notably, an empty link state Update packet 600 does not contain any LSAs 652.

For every interface in the Waiting/Preempt state, the reloaded NSF router periodically sends empty link state Update packets to a predetermined multicast address, e.g., an ALLSPFRouters IP address. The first empty link state update packet is sent immediately when the interface FSM is placed into the Waiting/Preempt state. Subsequent packets are preferably sent within a 2-second interval during the first Hello interval (a default setting of the Hello interval may be 10 seconds). Since reception of a valid packet resets a neighbor's inactivity timer, the empty Update packets 600 prevent neighboring routers from declaring the adjacencies down before the first Hello packets 400 are received by the reloaded NSF router. This action/behavior of the router is preferably transparent to the other neighboring routers.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for restoring adjacencies between a router and its neighbors during reload of routing software on the router, the method comprising the steps of:

placing an interface of the router in a predetermined state that enables the router to receive incoming Hello packets from its neighbors over a computer network;

creating a unicast Hello packet in response to receiving an incoming Hello packet from each neighbor; and sending the unicast Hello packet to each neighbor from whom it has received an incoming Hello packet to thereby prevent the neighbor from dropping its adjacency with the router.

2. The method of claim 1 further comprising the steps of:

determining if a neighbor data structure exists for each neighbor sending an incoming Hello packet; and if not, creating a neighbor data structure for each neighbor sending the incoming Hello packet.

3. The method of claim 2 wherein the predetermined state is a Waiting state with an asserted Preempt flag.

4. The method of claim 3 further comprising the step of providing the Preempt flag within the neighbor data structure.

5. The method of claim 1 wherein the routing software is Open Shortest Path First (OSPF) routing protocol software.

6. The method of claim 1 further comprising the steps of:

in response to the step of placing, sending empty link state Update packets from the router over the interface;

receiving the empty link state Update packets at the neighbors; and in response to the step of receiving, resetting an inactivity timer for the router at each neighbor to thereby prevent the neighbor from resetting its adjacency with the router before the router sends the unicast Hello packet.

7. An apparatus for restoring an adjacency between a router and its neighbor during reload of routing software on the router, the apparatus comprising:

an interface adapted for placement into a predetermined state that enables the router to receive an incoming Hello packet from the neighbor over a computer network;

a processor coupled to the interface; and a unicast Hello packet created by the processor in response to receiving an incoming Hello packet from the neighbor, the unicast Hello packet sent to the neighbor to thereby prevent the neighbor from dropping the adjacency with the router.

8. The apparatus of claim 7 further comprising, wherein the predetermined state is a Waiting state with an asserted Preempt flag:

a memory coupled to the processor; and a neighbor data structure stored in the memory, the neighbor data structure containing information pertinent to the adjacency formed between the router and neighbor, the neighbor data structure further configured to store the Preempt flag.

9. The apparatus of claim 8 further comprising:

an empty link state Update packet created by the processor and multicasted over the network in response placement of the interface into the Waiting state with an asserted Preempt flag; and an inactivity timer for the router stored at the neighbor, the inactivity timer reset in response to receiving the empty link state packet at the neighbor to thereby prevent the neighbor from resetting its adjacency with the router before the router sends the unicast Hello packet.

10. Apparatus for restoring an adjacency between a router and its neighbor during reload of routing software on the router, the apparatus comprising:

means for placing an interface of the router in a predetermined state that enables the router to receive incoming Hello packets from its neighbors over a computer network;

means for creating a unicast Hello packet in response to receiving an incoming Hello packet from each neighbor; and means for sending the unicast Hello packet to each neighbor from whom it has received an incoming Hello packet to thereby prevent the neighbor from dropping its adjacency with the router.

11. The apparatus of claim 10 further comprising:

means for determining if a neighbor data structure exists for each neighbor sending an incoming Hello packet; and means for creating a neighbor data structure for each neighbor sending the incoming Hello packet, if the neighbor data structure does not exist.

12. The apparatus of claim 11 wherein the predetermined state is a Waiting state with an asserted Preempt flag.

13. The apparatus of claim 12 further comprising means for providing the Preempt flag within the neighbor data structure.

14. The apparatus of claim 13 wherein the routing software is Open Shortest Path First (OSPF) routing protocol software.

15. The apparatus of claim 14 further comprising:

means for sending empty link state Update packets from the router over the interface; and means for resetting an inactivity timer for the router at the neighbor in response to receiving the empty link state Update packets, the reset inactivity timer preventing the neighbor from resetting its adjacency with the router before the router sends the unicast Hello packet.

16. A computer readable medium containing executable program instructions for restoring adjacencies between a router and its neighbors during reload of routing software on the router, the executable program instructions comprising program instructions for:

placing an interface of the router in a predetermined state that enables the router to receive incoming Hello packets from its neighbors over a computer network;

creating a unicast Hello packet in response to receiving an incoming Hello packet from each neighbor; and sending the unicast Hello packet to each neighbor from whom it has received an incoming Hello packet to thereby prevent the neighbor from dropping its adjacency with the router.

17. The computer readable medium of claim 16 further comprising program instructions for:

determining if a neighbor data structure exists for each neighbor sending an incoming Hello packet; and if not, creating a neighbor data structure for each neighbor sending the incoming Hello packet.

18. The computer readable medium of claim 17 wherein the predetermined state is a Waiting state with an asserted Preempt flag.

19. The computer readable medium of claim 18 further comprising program instructions for providing the Preempt flag within the neighbor data structure.

20. The computer readable medium of claim 19 further comprising program instructions for:

in response to the step of placing, sending empty link state Update packets from the router over the interface;

receiving the empty link state Update packets at the neighbors; and in response to the step of receiving, resetting an inactivity timer for the router at each neighbor to thereby prevent the neighbor from resetting its adjacency with the router before the router sends the unicast Hello packet.

21. A method for restoring adjacencies between a router and its neighbors during reload of routing software on the router, the method comprising the steps of:

determining if a neighbor data structure exists for each neighbor from which an incoming Hello packet was received;

if not, creating a neighbor data structure for each neighbor from which an incoming Hello packet was received;

placing an interface of the router in a predetermined state that enables the router to receive incoming Hello packets from its neighbors over a computer network;

creating a unicast Hello packet in response to receiving an incoming Hello packet from each neighbor and in response to the created neighbor data structure and the predetermined state; and sending the unicast Hello packet to each neighbor from whom it has received an incoming Hello packet to thereby prevent the neighbor from dropping its adjacency with the router.

22. The method of claim 21 further compromising:

indicating that the predetermined state is a Waiting state with an asserted Preempt flag.

23. The method of claim 22 further comprising:

providing the Preempt flag within the neighbor data structure.

24. A method for restoring adjacencies between a router and its neighbors during reload of routing software on the router, the method comprising the steps of:

placing an interface of the router in a predetermined state that enables the router to receive incoming Hello packets from its neighbors over a computer network;

creating a unicast Hello packet in response to receiving an incoming Hello packet from each neighbor;

sending the unicast Hello packet to each neighbor from whom it has received an incoming Hello packet to thereby prevent the neighbor from dropping its adjacency with the router;

in response to the step of placing, sending an empty link state Update packet from the router over the interface to a selected neighbor;

receiving the empty link state Update packet at the selected neighbor; and in response to the step of receiving, resetting an inactivity timer for the router at the selected neighbor to thereby prevent the selected neighbor from resetting its adjacency with the router before the router sends the unicast Hello packet.

25. Apparatus for restoring an adjacency between a router and its neighbor during reload of routing software on the router, the apparatus comprising:

means for determining if a neighbor data structure exists for each neighbor from which an incoming Hello packet was received;

means for creating a neighbor data structure for each neighbor from which an incoming Hello packet was received, if the neighbor data structure does not exist;

means for placing an interface of the router in a predetermined state that enables the router to receive incoming Hello packets from its neighbors over a computer network;

means for creating a unicast Hello packet in response to receiving an incoming Hello packet from each neighbor and in response to the created neighbor data structure and the predetermined state; and means for sending the unicast Hello packet to each neighbor from whom it has received an incoming Hello packet to thereby prevent the neighbor from dropping its adjacency with the router.

26. The apparatus of claim 25 further comprising:
means for indicating that the predetermined state is a Waiting state with an asserted Preempt flag.

27. The apparatus of claim 26 further comprising:
means for providing the Preempt flag within the neighbor data structure.

28. Apparatus for restoring an adjacency between a router and its neighbor during reload of routing software on the router, the apparatus comprising:

means for placing an interface of the router in a predetermined state that enables the router to receive incoming Hello packets from its neighbors over a computer network;

means for creating a unicast Hello packet in response to receiving an incoming Hello packet from each neighbor; and means for sending the unicast Hello packet to each neighbor from whom it has received an incoming Hello packet to thereby prevent the neighbor from dropping its adjacency with the router;

means for sending an empty link state Update packet from the router over the interface to a selected neighbor; and means for the selected neighbor to reset an inactivity timer for the router in response to receiving the empty link state Update packet, the reset inactivity timer preventing the selected neighbor from resetting its adjacency with the router before the router sends the unicast Hello packet.

29. Apparatus for restoring an adjacency between a router and its neighbor during reload of routing software on the router, the apparatus comprising:

an interface adapted for placement into a predetermined state that enables the router to receive an incoming Hello packet from the neighbor over a computer network;

a processor;

a memory coupled to the processor, a neighbor data structure stored in the memory, the neighbor data structure containing information pertinent to the adjacency formed between the router and neighbor; and a unicast Hello packet created by the processor in response to receiving an incoming Hello packet from the neighbor, the unicast Hello packet sent to the neighbor to thereby prevent the neighbor from dropping the adjacency with the router.

30. The apparatus of claim 29 further comprising:
the predetermined state is a Waiting state with an asserted Preempt flag.

31. The apparatus of claim 30 further comprising:
the neighbor data structure is further configured to store the Preempt flag.

32. Apparatus for restoring an adjacency between a router and its neighbor during reload of routing software on the router, the apparatus comprising:

an interface adapted for placement into a predetermined state that enables the router to receive an incoming Hello packet from the neighbor over a computer network;

a processor;

an empty link state Update packet created by the processor and multicasted over the network in response to placement of the interface into a Waiting state during the reload of routing software;

the empty link state Update packet received at a neighbor; and an inactivity timer for the router at the neighbor, the inactivity timer reset in response to receiving the empty link state Update packet to thereby prevent the neighbor from resetting its adjacency with the router before the router sends the unicast Hello packet.

33. A computer readable medium containing executable program instructions for restoring adjacencies between a router and its neighbors during reload of routing software on the router, the executable program instructions comprising program instructions for:

determining if a neighbor data structure exists for each neighbor sending an incoming Hello packet;

if not, creating a neighbor data structure for each neighbor sending the incoming Hello packet;

placing an interface of the router in a predetermined state that enables the router to receive incoming Hello packets from its neighbors over a computer network;

creating a unicast Hello packet in response to receiving an incoming Hello packet from each neighbor and in response to the created data structure and predetermined state; and sending the unicast Hello packet to each neighbor from whom it has received an incoming Hello packet to thereby prevent the neighbor from dropping its adjacency with the router.

34. The computer readable medium of claim 33 further comprising:

indicating that the predetermined state is a Waiting state with an asserted Preempt flag.

35. The computer readable medium of claim 34 further comprising:
providing program instructions for storing the Preempt flag within the neighbor data structure.

36. A computer readable medium containing executable program instructions for restoring adjacencies between a router and its neighbors during reload of routing software on the router, the executable program instructions comprising program instructions for:
placing an interface of the router in a predetermined state that enables the router to receive incoming Hello packets from its neighbors over a computer network;
creating a unicast Hello packet in response to receiving an incoming Hello packet from each neighbor; and
sending the unicast Hello packet to each neighbor from whom it has received an incoming Hello packet to thereby prevent the neighbor from dropping its adjacency with the router;
in response to the step of placing, sending an empty link state Update packet from the router over the interface to a selected neighbor;
receiving the empty link state Update packet at the selected neighbor; and
in response to the step of receiving, resetting an inactivity timer for the router at selected neighbor to thereby prevent the selected neighbor from resetting its adjacency with the router before the router sends the unicast Hello packet.

37. A method for maintaining adjacencies between a router and its neighbors, the method comprising the steps of:
placing an interface of the router in a predetermined state that enables the router to receive incoming Hello packets from its neighbors over a computer network;
creating an outgoing Hello packet by the interface and in response to receiving an incoming Hello packet from each neighbor; and
sending the outgoing Hello packet to each neighbor from whom it has received an incoming Hello packet to thereby prevent the neighbor from dropping its adjacency with the router.

38. The method of claim 37 further comprising the steps of:
determining if a neighbor data structure exists for each neighbor from which an incoming Hello packet was received; and
if not, creating a neighbor data structure for each neighbor from which an incoming Hello packet was received.

39. The method of claim 38 further comprising:
indicating that the predetermined state is a Waiting state with an asserted Preempt flag.

40. The method of claim 39 further comprising:
providing the Preempt flag within the neighbor data structure.

41. The method of claim 37 further comprising the steps of:
in response to the step of placing, sending an empty link state Update packet from the router over the interface to a selected neighbor;
receiving the empty link state Update packets at the selected neighbor; and
in response to the step of receiving, resetting an inactivity timer for the router at the selected neighbor to thereby prevent the selected neighbor from resetting its adjacency with the router before the router sends the outgoing Hello packet.

42. Apparatus for maintaining an adjacency between a router and its neighbor, the apparatus comprising:
means for placing an interface of the router in a predetermined state that enables the router to receive incoming Hello packets from its neighbors over a computer network;
means for creating an outgoing Hello packet by the interface and in response to receiving an incoming Hello packet; and
means for sending the outgoing Hello packet to each neighbor from whom it has received an incoming Hello packet to thereby prevent the neighbor from dropping its adjacency with the router.

43. The apparatus of claim 42 further comprising:
means for determining if a neighbor data structure exists for each neighbor from which an incoming Hello packet was received; and
means for creating a neighbor data structure for each neighbor from which the incoming Hello packet was received, if the neighbor data structure does not exist.

44. The apparatus of claim 43 further comprising:
means for indicating that the predetermined state is a Waiting state with an asserted Preempt flag.

45. The apparatus of claim 44 further comprising:
means for providing the Preempt flag within the neighbor data structure.

46. The apparatus of claim 42 further comprising:
means for sending an empty link state Update packet from the router over the interface to a selected neighbor; and
means for resetting an inactivity timer for the router at the selected neighbor in response to receiving the empty link state Update packet, the reset inactivity timer preventing the selected neighbor from resetting its adjacency with the router before the router sends the outgoing Hello packet.

47. Apparatus for maintaining an adjacency between a router and its neighbor, the apparatus comprising:
an interface adapted for placement into a predetermined state that enables the router to receive an incoming Hello packet from the neighbor over a computer network; and
an outgoing Hello packet created by the interface and in response to receiving an incoming Hello packet from the neighbor, the outgoing Hello packet sent to the neighbor to thereby prevent the neighbor from dropping the adjacency with the router.

48. The apparatus of claim 47 further comprising:
the predetermined state is a Waiting state with an asserted Preempt flag; and
a neighbor data structure stored in memory, the neighbor data structure containing information pertinent to the adjacency formed between the router and neighbor, the neighbor data structure further configured to store the Preempt flag.

49. The apparatus of claim 47 further comprising:
an empty link state Update packet created in response to the placement of the interface into the predetermined state and the empty link state Update packet multicasted over the network;
the empty link state Update packet received at a neighbor; and
an inactivity timer for the router at the neighbor, the inactivity timer reset in response to receiving the empty link state Update packet at the neighbor to thereby prevent the neighbor from resetting its adjacency with the router before the router sends the outgoing Hello packet.

50. A computer readable medium containing executable program instructions for maintaining adjacencies between a router and its neighbors, the executable program instructions comprising program instructions for:
- placing an interface of the router in a predetermined state that enables the router to receive incoming Hello packets from its neighbors over a computer network;
- creating an outgoing Hello packet by the interface and in response to receiving an incoming Hello packet from each neighbor; and
- sending the outgoing Hello packet to each neighbor from whom it has received an incoming Hello packet to thereby prevent the neighbor from dropping its adjacency with the router.

51. A method for restoring adjacencies between a router and its neighbors during reload of routing software on the router, the method comprising the steps of:
- placing an interface of the router in a predetermined state that enables the router to receive incoming Hello packets from its neighbors over a computer network;
- creating a unicast Hello packet by the interface, the unicast Hello packet in response to receiving an incoming Hello packet from a neighbor; and
- sending the unicast Hello packet by the interface to each neighbor from whom it has received an incoming Hello packet.

52. The method of claim 51, further comprising:
using processing logic within the interface to create and send the unicast Hello packet.

53. The method of claim 51, further comprising:
receiving by each neighbor router the unicast Hello packet to thereby prevent the neighbor from dropping its adjacency with the router.

54. The method of claim 52, further comprising:
- in response to the step of placing, sending empty link state Update packets from the router over the interface;
- receiving the empty link state Update packets at the neighbors; and
- in response to the step of receiving, resetting an inactivity timer for the router at each neighbor to thereby prevent the neighbor from resetting its adjacency with the router before the neighbor router sends the unicast Hello packet.

55. The method of claim 51, further comprising:
sending an empty link state Update packet to force the neighbor to reset an inactivity timer for the router.

56. An apparatus for restoring adjacencies between a router and its neighbors during reload of routing software on the router, the apparatus comprising:
- means for placing an interface of the router in a predetermined state that enables the router to receive incoming Hello packets from its neighbors over a computer network;
- means for creating a unicast Hello packet by the interface, the unicast Hello packet in response to receiving an incoming Hello packet from each neighbor; and
- means for sending the unicast Hello packet by the interface to each neighbor from whom it has received an incoming Hello packet to thereby prevent the neighbor from dropping its adjacency with the router.

57. The apparatus of claim 56, further comprising:
means for using processing logic within the interface to create and send the unicast Hello packet.

58. The method of 56, further comprising:
receiving by each neighbor router the unicast Hello packet to thereby prevent the neighbor from dropping its adjacency with the router.

59. The apparatus of claim 58, further comprising:
- in response to the step of placing, means for sending empty link state Update packets from the router over the interface;
- means for receiving the empty link state Update packets at the neighbors; and
- in response to the step of receiving, means for resetting an inactivity timer for the router at each neighbor to thereby prevent the neighbor from resetting its adjacency with the router before the router sends the unicast Hello packet.

60. The apparatus of claim 56, further comprising:
means for sending an empty link state Update packet to force the neighbor to reset an inactivity timer for the router.

61. An Apparatus for restoring an adjacency between a router and its neighbor during reload of routing software on the router, the apparatus comprising:
- an interface adapted for placement into a predetermined state that enables the router to receive an incoming Hello packet from the neighbor over a computer network;
- a processor coupled to the interface on a line card; and
- a unicast Hello packet created by the processor in response to receiving an incoming Hello packet from the neighbor, the unicast Hello packet sent to the neighbor.

62. The apparatus of claim 61, further comprising:
- an empty link state Update packet created by the processor and multicasted over the network in response placement of the interface into a Waiting state with an asserted Preempt flag; and
- an inactivity timer for the router stored at the neighbor, the inactivity timer reset in response to receiving the empty link state packet at the neighbor to thereby prevent the neighbor from resetting its adjacency with the router before the router sends the unicast Hello packet.

63. A method for restoring adjacencies between a router and its neighbors during reload of routing software on the router, the method comprising the steps of:
- placing an interface of the router in a predetermined state that enables the router to receive incoming Hello packets from its neighbors over a computer network;
- creating a unicast Hello packet by the interface, the unicast Hello packet in response to receiving an incoming Hello packet from a neighbor; sending the unicast Hello packet by the interface to each neighbor from whom it has received an incoming Hello packet; and
- in response to a neighbor router receiving the Hello packet, preventing the neighbor router from dropping its adjacency with the router.

64. An apparatus for restoring adjacencies between a router and its neighbors during reload of routing software on the router, the method comprising the steps of:
- means for placing an interface of the router in a predetermined state that enables the router to receive incoming Hello packets from its neighbors over a computer network;
- means for creating a unicast Hello packet by the interface, the unicast Hello packet in response to receiving an incoming Hello packet from a neighbor;
- means for sending the unicast Hello packet by the interface to each neighbor from whom it has received an incoming Hello packet; and
- in response to a neighbor router receiving the Hello packet, means for preventing the neighbor router from dropping its adjacency with the router.

65. An Apparatus for restoring an adjacency between a router and its neighbor during reload of routing software on the router, the apparatus comprising:
- an interface adapted for placement into a predetermined state that enables the router to receive an incoming Hello packet from the neighbor over a computer network;
- a processor coupled to the interface on a line card; and
- a unicast Hello packet created by the processor in response to receiving an incoming Hello packet from the neighbor, the unicast Hello packet sent to a neighbor router;
- the neighbor router, in response to the Hello packet, is prevented from dropping the adjacency with the router.

* * * * *